United States Patent
Jensen

[15] 3,685,870
[45] Aug. 22, 1972

[54] SPRING BRAKE CONTROL VALVE

[72] Inventor: James R. Jensen, Newark, Calif.

[73] Assignee: Pacific Car and Foundry Company (Peterbilt Motors Company Division), Renton, Wash.

[22] Filed: Dec. 2, 1970

[21] Appl. No.: 94,460

[52] U.S. Cl. .................................. 303/71, 303/85
[51] Int. Cl. ........................ B60t 13/22, B60t 11/34
[58] Field of Search ............................ 303/71, 85

[56] References Cited

UNITED STATES PATENTS

| | | | |
|---|---|---|---|
| 3,224,815 | 12/1965 | Horowitz | 303/71 |
| 3,168,353 | 2/1965 | Horowitz | 303/71 X |

*Primary Examiner*—Evon C. Blunk
*Assistant Examiner*—H. S. Lane
*Attorney*—Owen, Wickersham & Erickson

[57] ABSTRACT

A single valve means is provided to control air-operated spring brakes. One rod operates two valve elements or discs spaced from each other, one valve element automatically acting to seal off the service air line upon failure of service air pressure, and the other valve element controlling air pressure from a protected air tank to the spring brake units. Both valve elements are spring-biased and are operated by the rod and partly by the service air and protected tank pressures, respectively. When service air pressure fails, the rod and first valve move upwardly, cutting off the service air line and opening the spring brake line to the atmosphere, reducing pressure thereon so as to cause application of the brakes. Simultaneously, upon upward motion of the rod, the second valve closes off the spring brake line from the air pressure from the protected tank, bleeding pressure to the atmosphere from the spring brake line. The brakes can then only be released by repair or by manually holding the rod down in driving position.

6 Claims, 3 Drawing Figures

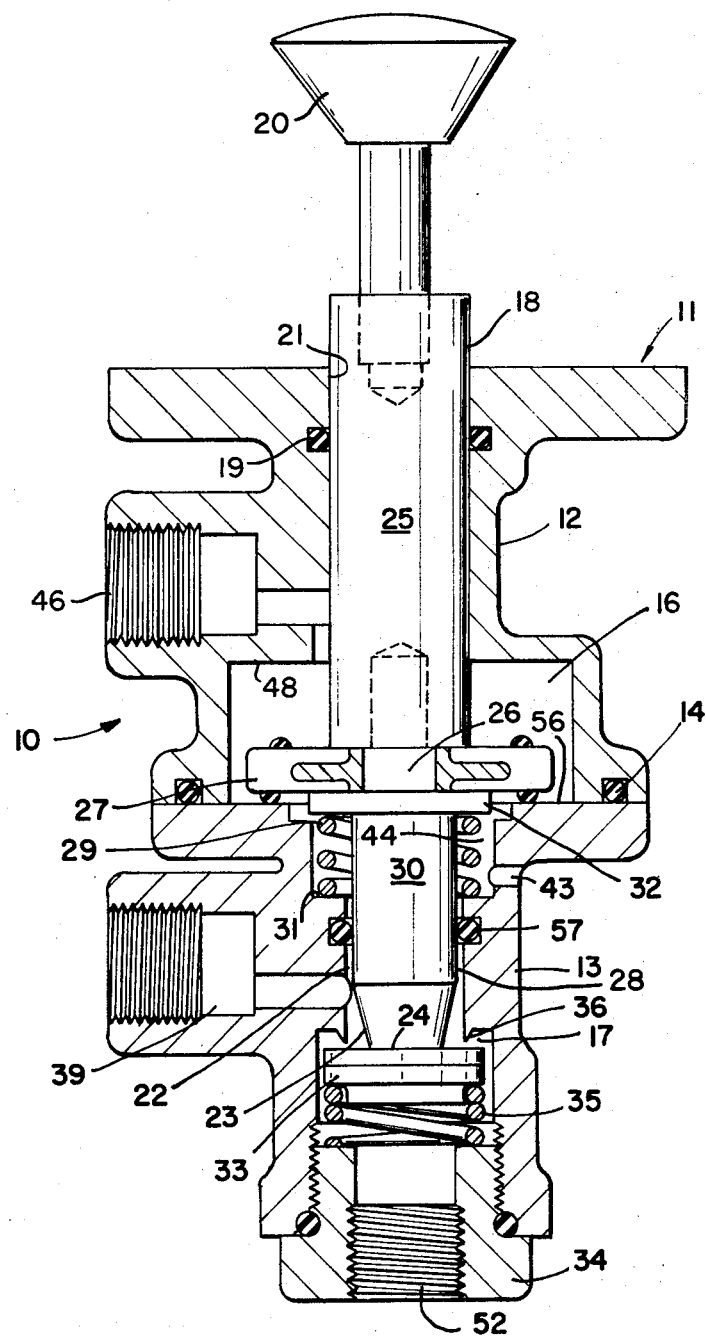
FIG_1

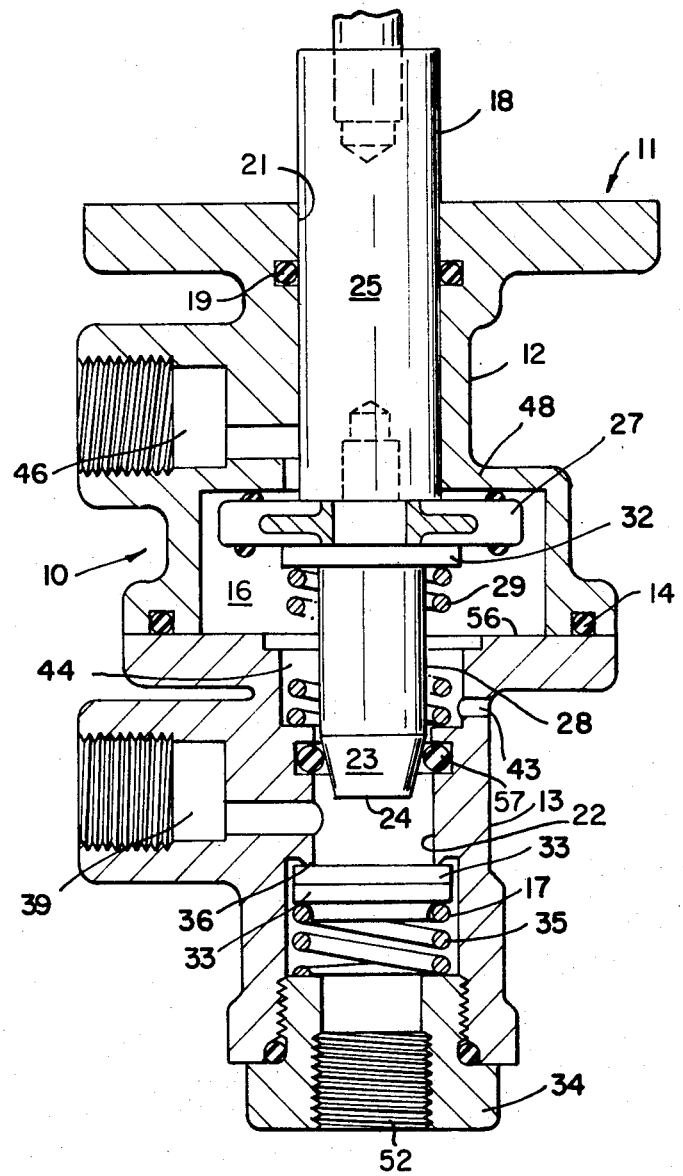
FIG_2
INVENTOR.
JAMES R. JENSEN

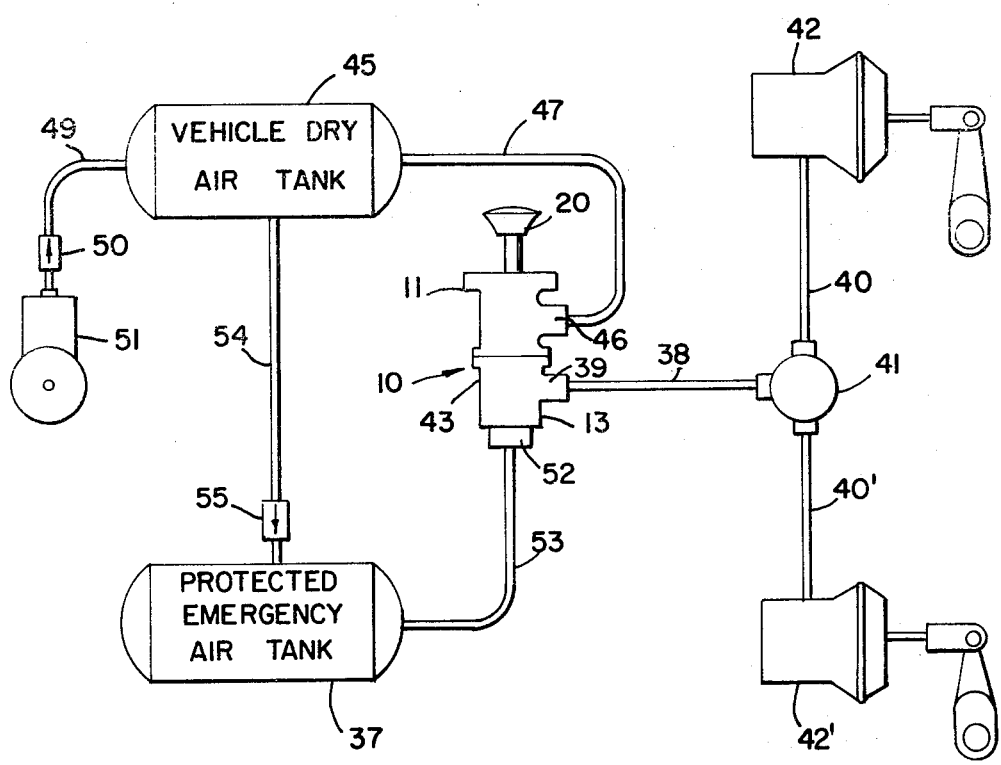
FIG_3

SPRING BRAKE CONTROL VALVE

BACKGROUND OF THE INVENTION

This invention relates to means for emergency control of an automobile spring brake system, particularly in trucks which utilize brakes operated by air.

Two general types of spring brake release systems are now in common use in the operation of air brakes on heavy duty trucks. These systems are the automatic system and the manual system.

In the automatic system, service air is used to hold the spring brakes in a released position. If the service air pressure is lost there is nothing to hold the spring brakes in this released position, and they apply the emergency brakes automatically. The spring brakes can then be released by operating a separate valve or combination of valves to route air from a protected reservoir or third tank into the release system. The automatic system has the advantage that its application of the emergency brake is automatic, but it also has disadvantages. Variations in service air pressure cause the spring brakes to travel, causing wear and sometimes causing brake drag. The release of the emergency brake after a service air failure by a separate valve or combination of valves, can cause confusion in an emergency situation. Furthermore, t least two valves have been required in most such apparatus. One which does use a single valve to perform the above functions has its own disadvantages; it uses the service air pressure to hold the brakes "off", and it uses a pull for emergency release and a push for normal driving, which can be confusing.

In the manual system, air from a protected reservoir or tank is used to hold the spring brakes released for normal driving. The spring brakes cannot sense a service air pressure loss, and so this system does not give an automatic application of brakes in an emergency situation. The driver must apply the spring brakes by manually operating a control valve. This system has the disadvantages of not providing automatic application of the spring brakes and of permitting the driver to override or ignore service air failure and to continue to drive, sometimes for long distances, without correcting the condition,—a very unsafe and undesirable situation.

The above disadvantages are overcome and other advantages are obtained by the present invention, as will be evident from the description below. One advantage of the present invention is that it provides automatic application of the emergency brake upon service air pressure loss. Another advantage is that a single valve control is provided at all times, thereby eliminating numerous elements and working parts that were required in prior art systems. The present invention provides a constant hold-off pressure, so that creep or brake drag is avoided; and it also provides a "dead man" feature on the emergency release position to prevent the driver from overriding or ignoring automatic application of the emergency brake, thus increasing the safety of operation.

SUMMARY OF THE INVENTION

This invention relates to means to hold spring brakes of a service air-operated brake system in released position during normal driving and to apply such brakes automatically and to hold them in the applied position if the service air pressure is lost. More particularly, it relates to a single valve means which is operated by air from a protected reservoir to hold the brakes in the released position, and it has a sensing means to effect automatic application upon such loss of service air pressure.

The control valve of the present invention comprises a shell or housing having a first chamber and a second chamber disposed axially of the housing, spaced from each other and having an axial passageway therebetween to accommodate a valve rod. A first aperture or port in the shell near the first chamber enables communication between that chamber and a conduit leading to the service air reservoir or tank. A second aperture or port in the shell near the second chamber enables communication between that chamber and the spring brakes. A third aperture or port disposed at the base of the second chamber enables communication between that chamber and a reserve or protected air tank. A fourth aperture or port in the shell, disposed between the first chamber and the second chamber is open to the atmosphere and may be termed a bleed to atmosphere.

A valve rod extends axially of the shell, passing through the first chamber and the axial passageway, and it extends into the second chamber when the device is in driving position. A seal between the shell and the valve rod normally prevents communication between the second aperture and the bleed to atmosphere, but the rod is designed, e.g., by tapering at its lower end, so as to provide, in a retracted position, a passage for fluid from the second aperture and the conduit to the bleed to atmosphere. A valve disc is slidably disposed within the second chamber off from the second chamber and is spring-biased so as to close the second aperture when the pressure of the rod against the valve disc is relieved or removed and to open it when pressure is applied. There is never any communication between the first and second chambers or between the first and second apertures.

Disposed within the first chamber and affixed to the valve rod is an annular valve means or disc which is also spring-biased and is adapted to close the first chamber off from the first aperture when the rod is pulled up by the driver or when the service air pressure fails or is reduced, so as to enable its spring to act. Thus, in normal driving, the service air pressure which never communicates with the cylinders that control the spring brakes holds the annular valve down against the biasing spring and thereby holds the valve disc in the second chamber in open position, so that the pressure from the reserve tank holds the spring brakes in inoperative position. The reserve tank fluid pressure operates to control the spring brakes (not shown) through any conventional and well-known means or system such as a spring-biased diaphragm or piston (not shown). When the service air pressure fails, the valve disc in the second chamber is closed, to prevent application of the reserve air to the spring brakes, and the second aperture is bled to atmosphere, so that the spring brakes are applied.

The valve rod can be manually operated by the driver in an emergency, when the service air pressure fails, but in the system of this invention the valve rod must be manually held continuously, thereby preventing the driver from driving for any substantial distance. As a result, the driver cannot ignore such pressure loss and must seek help or repair the system promptly.

BRIEF DESCRIPTION OF THE DRAWINGS

The invention and one mode of carrying it out will be illustrated by the description which follows and by the accompanying drawings which are illustrative only and are not to be taken as limitative because variations and modifications can be made therein without departing from the spirit and scope of the appended claims.

In the drawings:

FIG. 1 is a vertical sectional view of the valve means of this invention, the valve being in the drive position.

FIG. 2 is a similar vertical sectional view showing the valve in the park position.

FIG. 3 is a schematic view showing the relationship of the valve of this invention to the other features of a braking system.

DETAILED DESCRIPTION OF THE INVENTION

The invention will be described with reference to the drawings, as illustrating one mode of carrying out the invention. A control valve means 10 includes a generally tubular housing or shell 11 comprising an upper portion 12 and a lower portion 13 held together and sealed by an O-ring. Within the upper portion 12 is a first chamber 16 and within the lower portion 13 is a second chamber 17. A valve rod 18 extends from a hand-grip 20 through (and is sealed by an O-ring 19 to) a suitable aperture 21 in the top of upper portion 12, through the chamber 16 and an axial or central passageway 22, terminating in the chamber 17 when in the "drive" position. The lower end portion 23 of the rod 18 tapers inwardly to its end face 24 to permit fluid flow past the rod 18 when in the "drive" position.

In this embodiment, the upper portion 25 of the rod 18 has a narrowed shank 26 at its lower end; and a first or annular valve element 27 fits around the shank 26 and moves up and down within the chamber 16 as the rod 18 moves up and down. A lower portion 28 of the rod 18 is detachably affixed to the upper portion 25, as by being threaded thereto or affixed by any other desired means. A first spring 29 fits around the upper part 30 of the lower portion 28, bearing at one end on an annular shoulder 31 and at its other end on the lower surface of an annular flange 32 supporting and locking the valve element or disc 27 in place. The valve element 27 desirably has an elastomeric surface to effect a good seal when in a cut-off position, as shown in FIGS. 1 and 2, with respect to a first aperture 46 and a service air tank 45, (see FIG. 3) as will be described.

Disposed in the second chamber 17 is a second valve disc 33 which is spring-biased upwardly by a spring 35 bearing against a closure plug 34, the latter being threadedly affixed and sealed to the shell 11. The valve disc 33 can move up and down within the chamber 17, and it is forced down by the rod 18 by contact with the end face 24, or up by the second spring 35 and by pressure from a protected air tank 37 (FIG. 3). The valve element 33, suitably of an elastomer, seats against a shoulder or annular seat 36 of the lower shell portion 13 to seal the inward gas pressure of the chamber 17 coming from the tank 37, and to close it off from an aperture 39. The aperture 39 is adapted to be threadedly connected to a conduit 38 (FIG. 3) leading to a quick-release valve 41 and thence by conduits 40 and 40' to spring brake elements in housings 42, and 42'.

Disposed between the chambers 16 and 17 is an aperture 43 in the shell 11 which communicates with the atmosphere at all times, and with a chamber 44 in which is disposed a first spring 29. Thus, in "park" position the chamber 16 and the aperture 39 are under atmospheric pressure only, as shown in FIG. 2, communication with both the service air tank 45 and the protected air tank 37 being cut off. As shown in FIG. 3, the first aperture 46 in the upper shell 12 communicates with the first chamber 16 and is adapted to be threadedly connected to a conduit 47 leading to the service air tank 45. This aperture 46 is sealed off when the first valve disc 27 seats against an upper shoulder 48 of the shell 11, the valve rod 18 then being raised or pulled up so that the second valve disc 33 seats against the shoulder 36 and seals off the aperture 39 from air pressure from the tank 37, and the disc 33 is then impelled toward the shoulder 36 by both the air pressure from the tank 37 and the spring 35.

In the operation of the device of this invention, in "driving" position, the valve unit 10 is disposed as shown in FIGS. 1 and 3. The aperture 39 is connected through the conduit 38, the quick-release valve 41 and the conduits 40 and 40' to the spring brake units 42, 42', while the aperture 46 is connected through the conduit 47 to the service air tank 45. The service tank 45 is in turn connected through a conduit 49 and a one-way check valve 50 to a source of pressurized air 51, such as an air pump operated in the known manner (not shown). An aperture 52 in the closure 34 is connected with the protected tank 37 by means of a conduit 53, and a further conduit 54 having a one-way check valve 55 leads from the tank 45 to the tank 37 to recharge the latter when necessary. Closing and sealing means, it will be understood, are provided wherever deemed necessary by those skilled in this art.

When the valve 10 is in driving situation, therefore, the spring brakes 42 and 42' are held off from braking contact by pressure from the protected tank 37 acting through the conduit 53, the chamber 17, the aperture 39 and the conduit 38, all in open communication with each other; and the service air pressure acting on the top surface of the valve disc 27 through the conduit 47, the aperture 46 and the chamber 16, holds the valve disc 27 down in sealed relationship against the shoulder or top surface 56 of the lower portion 13 and drives the inner face 24 of the rod 18 against the valve disc 33 to keep the aperture 39 open to the chamber 17 and to air pressure from the protected tank 37. An O-ring 57 seals the chamber 17 from the aperture 43 and the chamber 16 in this position.

When air service pressure is lost, the valve 27 rises through the chamber 16 and seats against the shoulder 48, sealing off the aperture 46 and the conduit 47. At the same time, the valve 33 rises in the chamber 17 and seals the aperture 39 from the air pressure from the protected tank 37. The lower end portion 23 of the rod 18 rises above the seal 57, effecting communication between the aperture 39 and the atmosphere through the aperture 43, reducing the pressure in the line 38, so that the spring brakes are no longer held off by pressure in the usual known way and now act to brake the vehicle. This result can be overcome only by repairing the cause of failure of the service air line or by manually continuously holding the rod 18 in "drive" position, so that operation of the vehicle for any appreciable distance is prevented.

It will be understood that the above specific description and the drawings are given for purposes of illustration only, and that modifications and variations can be made therein without departing from the spirit and scope of the appended claims.

Having now described the invention, what is claimed is:

1. A control valve for an air-operated spring brake system having a service air supply and a separate source of air, comprising in combination:
   a shell and, disposed therein,
   first valve means adapted for control by said service air supply,
   second valve means spaced from said first valve means and adapted to control the application of said separate source of air to said spring brakes, and
   means responsive to failure of said service air supply for operating both said valve means simultaneously, so that said separate source of air is automatically cut off from said brakes upon failure of said service air supply,
   said shell having a port in open communication with the atmosphere to vent said brakes to atmosphere upon said failure.

2. A control valve for an air-operated spring brake system having a source of service air and a separate source of air, comprising in combination:
   a valve shell having a first chamber, a second chamber spaced axially from said first chamber, an axial passageway extending between said chambers, a first port adapted to be connected to said source of service air, a second port adapted to be connected to said spring brake system for air operation thereof, a third port leading into said second chamber and adapted to be connected to said separate source of air, and a fourth port connecting said axial passageway to atmosphere,
   a valve rod extending through said axial passageway, having a handle outside said shell beyond said first chamber and having a tapered end portion adjacent to said second chamber,
   a first valve member secured to said rod, acting in a first position of said rod to close off said first port from said first chamber and to connect said first chamber to said fourth port, and acting in a second position of said rod to close off said first chamber from said axial passageway and said fourth port and to connect said first chamber to said first port, said first valve member being spring biased toward said first position and having a surface responsive to said service air entering through said first port for normally holding said first valve member in said second position by pneumatic pressure from said first port,
   a second valve member movable axially in said second chamber and spring biased toward a first position closing off said second port from said second chamber, and moved to a second position by the lower end of said valve rod when said rod is in its said second position, said second port and said second chamber then being in communication with each other, and
   an annular sealing member in said passageway sealing off said second port from said fourth port except when said rod is in its first position where its tapered lower end is opposite and spaced from said annular sealing member,
   whereby during normal operation said control valve holds said brake system in "off" position by pneumatic pressure from said separate source and said service air operates to hold said first valve member and said rod in said second position,
   said handle when pulled when parking, moving said rod to its said first position where the pneumatic pressure of said service air is unable to budge said first valve member and said rod, so that said second valve member closes and the brake system is both vented to atmosphere and cut off from said separate source, so that the braking system serves as a parking brake, and
   whereby during normal operation leakage from said service air system releases said rod so that the spring-biased first valve member and said rod move to said first position and said brake system is then actuated as an emergency brake by being closed off from said separate source and by being vented to atmosphere,
   said brake system then being releasable by manually pushing on said handle to said second position and holding it there.

3. A control valve for an air-operated spring brake system having a source of service air, a separate source of air, and
   spring brake means normally held against actuation by pressure from said separate source of air including in combination:
   actuating valve means spring-biased to a closed position for closing off said separate source from said spring brake means and having an open position for connecting said spring brake means to said separate source
   retaining valve means manually moved to a retaining position and having means responsive to the pressure of said service air for holding it there and biased toward a releasing position to which it is movable manually or by a drop in the pressure of said service air and is held there until manually moved, and
   coordinating means connected to said retaining valve means for holding said actuating valve in open position only so long as said retaining means is in its said retaining position and adapted for venting said spring brake means to atmosphere when said retaining means is in its releasing position.

4. An air-operated spring brake system including in combination:
   a source of service air,
   a separate source of air,
   spring brake means normally held against actuation by pressure from said separate source of air,
   actuating valve means spring-biased toward a closed position closing off said separate source from said spring brake means and venting said spring brake means to atmosphere, and having an open position closing off said spring brake means from atmosphere and connecting it to said separate source, retaining valve means responsive to the pressure of said service air, which, when manually moved to a retaining position, is held there by the pressure of said service air and when moved to a releasing position either manually or by the failure of pressure of said service air is held there until manually moved, and coordinating means connected to said retaining valve means for holding said actuating valve in open position only so long as said retaining means is in its said retaining position.

5. An air-operated spring brake system including in combination:

a source of service air, a separate source of air, spring brake means normally held against actuation by pressure from said separate source of air, actuating valve means spring-biased toward a closed position closing off said separate source from said spring brake means and having an open position connecting said spring brake means to said separate source, retaining valve means responsive to the pressure of said service air, which, when moved manually to a retaining position, is held there by the pressure of said service air and when moved to a releasing position either manually or by failure of the pressure of said service air is held there until manually moved, and coordinating means connected to said retaining valve means for holding said actuating valve in open position only so long as said retaining means is in its said retaining position and for venting said spring brake means to atmosphere when said retaining means is in its releasing position.

6. An air-operated spring brake system including in combination:

a source of service air, a separate source of air, spring brake means having air cylinder means for enabling prevention of actuation by application of pressure from said separate source of air, a valve shell having a first chamber, a second chamber spaced axially from said first chamber, an axial passageway extending between said chambers, a first port connected to said source of service air, a second port connected to said spring brake cylinder, a third port leading into said second chamber and connected to said separate source of air, and a fourth port connecting said axial passageway to atmosphere, a valve rod extending through said axial passageway having a handle outside said shell beyond said first chamber and having a tapered end portion adjacent to said second chamber, a first valve member secured to said rod, acting in a first position of said rod to close off said first port from said first chamber and to connect said first chamber to said fourth port, and acting in a second position of said rod to close off said first chamber from said axial passageway and said fourth port and to connect said first chamber to said first port, said first valve member being spring biased toward said first position and having a surface responsive to the pneumatic pressure of said service air applied via said first port for holding it in said second position, a second valve member movable axially in said second chamber and spring biased toward a first position closing off said second port from said second chamber, and moved to a second position by the lower end of said valve rod when said rod is in its said second position, said second port and said second chamber then being in communication with each other for application of pressure from said separate source to said cylinder means, and an annular sealing member in said passageway sealing off said second port from said fourth port except when said rod is in its first position where its tapered lower end is opposite and spaced from said annular sealing member, whereby during normal operation said brake system is held in "off" position by pneumatic pressure from said separate source and said service air operates to hold said first valve member and said rod in said second position, whereby during parking said handle when pulled, moving said rod to its said first position where the pneumatic pressure of said service air is unable to budge said first valve member and said rod, so that said second valve member closes and the brake system is both vented to atmosphere and cut off from said separate source, so that the braking system serves as a parking brake, and whereby during normal operation leakage from said service air system releases said rod so that the spring-biased first valve member and said rod move to said first position and said brake system is actuated as an emergency brake by being closed off from said separate source and by being vented to atmosphere, said brake system then being releasable by manually pushing said handle to said second position and holding it there.

* * * * *

PO-1050
(5/69)

UNITED STATES PATENT OFFICE
CERTIFICATE OF CORRECTION

Patent No. 3,685,870               Dated August 22, 1972

Inventor(s)            James R. Jensen

It is certified that error appears in the above-identified patent and that said Letters Patent are hereby corrected as shown below:

Sheet 2 of the drawings, Fig. 2, the lead line from the numeral 48 should extend to the lower surface of the member to which it is applied. Column 1, line 26, after "Furthermore," "t" should read --at--. Column 2, lines 34-37, these lines should read --duit to the bleed to atmosphere. A valve disc is slidably disposed within the second chamber and is spring-biased so as to close the second chamber off from the second aperture when the pressure of the rod against--.

Signed and sealed this 29th day of May 1973.

(SEAL)
Attest:

EDWARD M. FLETCHER, JR.           ROBERT GOTTSCHALK
Attesting Officer                 Commissioner of Patents